(12) United States Patent
Tanaka et al.

(10) Patent No.: US 12,283,720 B2
(45) Date of Patent: Apr. 22, 2025

(54) BUS BAR, AND BATTERY MODULE USING SAME

(71) Applicant: Vehicle Energy Japan Inc., Hitachinaka (JP)

(72) Inventors: Nobuyoshi Tanaka, Hitachinaka (JP); Kazuaki Urano, Hitachinaka (JP); Tatsuhiko Kawasaki, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 697 days.

(21) Appl. No.: 17/438,279

(22) PCT Filed: Dec. 3, 2019

(86) PCT No.: PCT/JP2019/047113
§ 371 (c)(1),
(2) Date: Sep. 10, 2021

(87) PCT Pub. No.: WO2020/183817
PCT Pub. Date: Sep. 17, 2020

(65) Prior Publication Data
US 2022/0149487 A1    May 12, 2022

(30) Foreign Application Priority Data
Mar. 12, 2019 (JP) ................................ 2019-044616

(51) Int. Cl.
*H01M 50/526* (2021.01)
*H01B 1/02* (2006.01)
(Continued)

(52) U.S. Cl.
CPC ............ *H01M 50/526* (2021.01); *H01B 1/02* (2013.01); *H01M 50/50* (2021.01); *H01M 50/569* (2021.01)

(58) Field of Classification Search
CPC .. H01M 50/526; H01M 50/50; H01M 50/569; H01M 50/503; H01M 50/522;
(Continued)

(56) References Cited

U.S. PATENT DOCUMENTS

2010/0247996 A1    9/2010  Ijaz et al.
2011/0064993 A1*   3/2011  Ochi ...................... H01M 50/00
                                                          429/158
(Continued)

FOREIGN PATENT DOCUMENTS

CN    203932177 U    11/2014
CN    104321905 A     1/2015
(Continued)

OTHER PUBLICATIONS

Machine Translation of Asai (WO2012118014 A1) provided with Office Action (Year: 2012).*

(Continued)

*Primary Examiner* — Roshn K Varghese
(74) *Attorney, Agent, or Firm* — Crowell & Moring LLP

(57) ABSTRACT

Provided is a busbar capable of keeping a joint strength high at a joint between dissimilar metals. The busbar (2) joins terminals of a plurality of battery cells, the terminals each including a dissimilar metal. The busbar includes: a copper portion (2e) to be connected to a first terminal (1n) of a first battery; an aluminum portion (2f) to be connected to a second terminal (1p) of a second battery; and a joint (2x) including the copper portion bonded to the aluminum portion. The aluminum portion is placed so as not to overlap the bonding region between the first terminal and the copper portion, and has arms (2f1) extending in a direction from the second terminal to the first terminal. The joint includes the (Continued)

copper portion bonded to the arms, and the arms have a width such that a proximal end portion is wider than a distal end portion of the arms.

11 Claims, 8 Drawing Sheets

(51) Int. Cl.
*H01M 50/50* (2021.01)
*H01M 50/569* (2021.01)

(58) Field of Classification Search
CPC . H01M 50/516; H01M 50/528; H01R 11/288; H01B 1/02; B23K 26/21; B23K 2103/10; B23K 2103/12; B23K 2103/18; B23K 20/10; Y02E 60/10
See application file for complete search history.

(56) References Cited

U.S. PATENT DOCUMENTS

| | | | |
|---|---|---|---|
| 2013/0012079 A1* | 1/2013 | Sakae | H01M 50/571 |
| | | | 439/884 |
| 2013/0200700 A1* | 8/2013 | Ohkura | H01M 10/425 |
| | | | 320/136 |
| 2013/0309537 A1 | 11/2013 | Zhao | |
| 2013/0309919 A1* | 11/2013 | Oda | H01R 11/11 |
| | | | 439/883 |
| 2015/0140391 A1 | 5/2015 | Sakate et al. | |
| 2018/0130989 A1 | 5/2018 | Saito et al. | |
| 2019/0119801 A1 | 4/2019 | Oda | |
| 2019/0232419 A1* | 8/2019 | Hahnlen | B32B 15/20 |

FOREIGN PATENT DOCUMENTS

| | | |
|---|---|---|
| CN | 104659317 A | 5/2015 |
| JP | 2012-515418 A | 7/2012 |
| JP | 2015-520934 A | 7/2015 |
| JP | 2016-92157 A | 5/2016 |
| WO | WO 2012/118014 A1 | 9/2012 |
| WO | WO 2016/175180 A1 | 11/2016 |
| WO | WO 2018/173586 A1 | 9/2018 |

OTHER PUBLICATIONS

International Search Report (PCT/ISA/210) issued in PCT Application No. PCT/JP2019/047113 dated Mar. 3, 2020 with English translation (four (4) pages).
Japanese-language Written Opinion (PCT/ISA/237) issued in PCT Application No. PCT/JP2019/047113 dated Mar. 3, 2020 (five (5) pages).
Chinese-language Office Action issued in Chinese Application No. 201980079171.9 dated Nov. 11, 2022 (10 pages).
Chinese-language Office Action issued in Chinese Application No. 201980079171.9 dated Jun. 6, 2023 (9 pages).
Chinese-language Office Action issued in Chinese Application No. 201980079171.9 dated Dec. 13, 2023 (2 pages).
Japanese-language Office Action issued in Japanese Application No. 2021-505513 dated Feb. 27, 2024 with English translation (29 pages).

* cited by examiner

HAVING HEIGHTS TO BE FLUSH

BUS BAR, AND BATTERY MODULE USING SAME

TECHNICAL FIELD

The present invention relates to busbars, and battery modules each including the busbars.

BACKGROUND ART

A plurality of battery cells making up a battery module are joined to each other at their terminals via a connecting conductor called a busbar. The background art relating to this busbar includes a technique disclosed in Patent Literature 1. Patent Literature 1 describes the technique for a busbar including a copper part (701) that is laser welded to a negative electrode group and is made of a copper material, and an aluminum part (702) that is laser welded to a cell positive electrode group and is made of aluminum. This technique linearly welds (705) these two parts made of two types of metals by an ultrasonic roller seam welding process (see paragraphs 0064, 0067 and FIG. 15).

CITATION LIST

Patent Literature

Patent Literature 1: JP 2012-515418 A

SUMMARY OF INVENTION

Technical Problem

A busbar joining the terminals of a plurality of batteries receives stress resulting from vibrations applied to the battery module or bulging of the battery cells during charging/discharging. A busbar including dissimilar metals bonded as in Patent Literature 1 therefore has to be configured to keep a joint strength high so that the joint between the dissimilar metals does not peel off when the stress acts on the joint between the dissimilar metals.

One of the problems to be solved by the present invention is to keep a joint strength high at the joint between dissimilar metals of a busbar.

Solution to Problem

According to one aspect of the present invention to solve the above problems, a busbar joins terminals of a plurality of battery cells, and the terminals each include a dissimilar metal. The busbar includes: a first metal member to be connected to a first terminal of a first battery; a second metal member to be connected to a second terminal of a second battery, the second metal member including a material that is different from a material of the first metal member; and a joint including the first metal member bonded to the second metal member. The second metal member is disposed so as not to overlap a bonding region between the first terminal and the first metal member, and has at least one arm extending in a direction from the second terminal to the first terminal. The joint includes the first metal member bonded to the at least one arm. The at least one arm has a width such that a proximal end portion is wider than a distal end portion of the arm.

Advantageous Effects of Invention

The present invention keeps a joint strength high at a joint between dissimilar metals including the first metal member and the second metal member. The present invention therefore enhances the resistance of the battery module against vibrations and the like, and provides a reliable battery module having excellent resistance.

Further features of the present invention will be clear from the following descriptions and the attached drawings. Other problems, configurations and advantageous effects also will be clear from the following descriptions of the embodiment.

DESCRIPTION OF EMBODIMENTS

Figure 1:
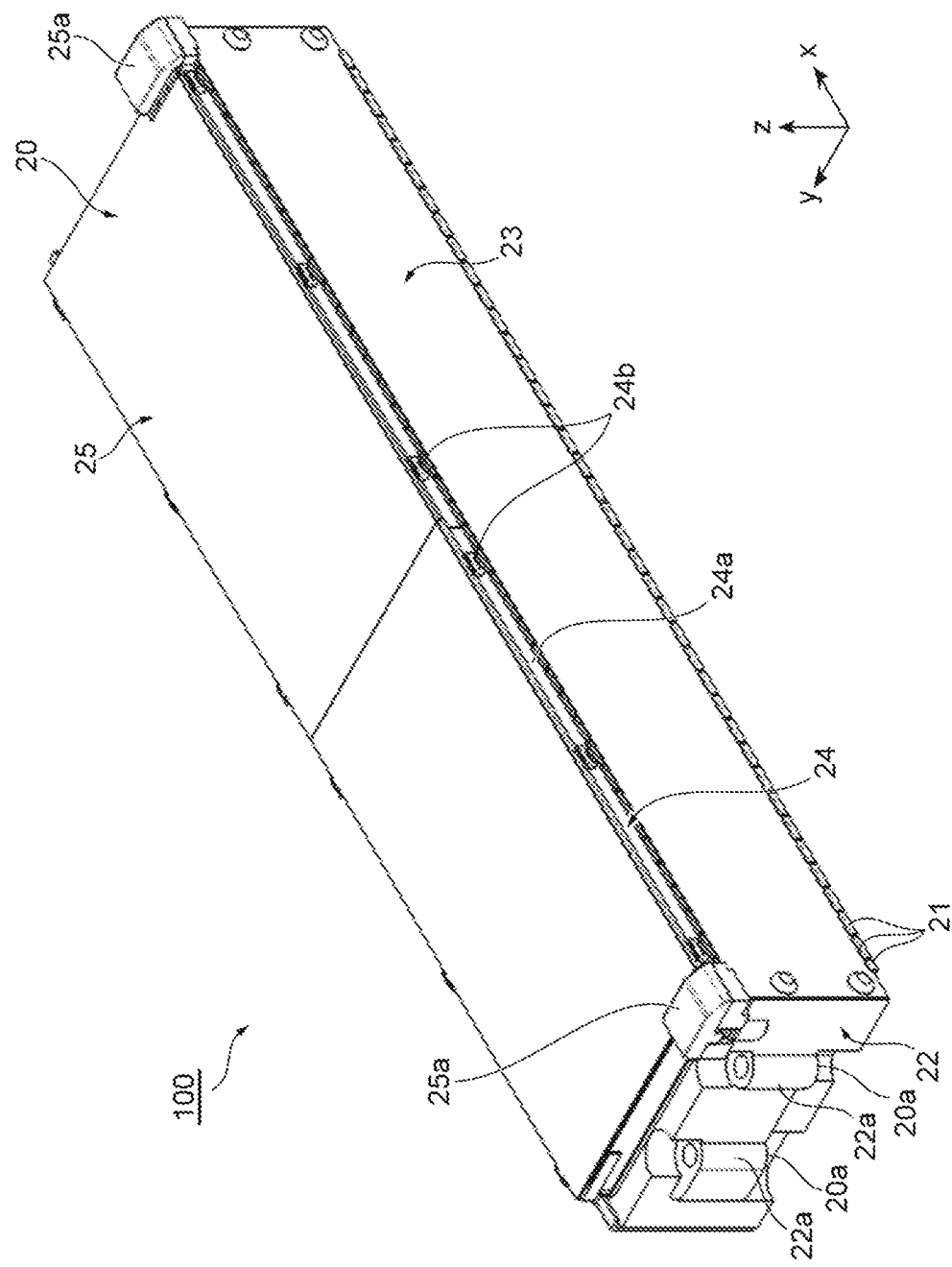
FIG. 1 is a perspective view showing the appearance of a battery module according to a first embodiment of the present invention.

The following describes some embodiments of the present invention, with reference to the attached drawings.

The following may describe various parts of the battery module while referring to the orthogonal coordinate system having x axis, y axis, and z axis as shown in the drawings or the directional terms, such as upper, lower, left, right, front, and rear. These axes and directions are used for convenience in describing the illustrated state of the battery module, and do not limit the posture or arrangement of the battery module.

First Embodiment

FIGS. 1 to 5 show a first embodiment of the present invention.

Figure 2:
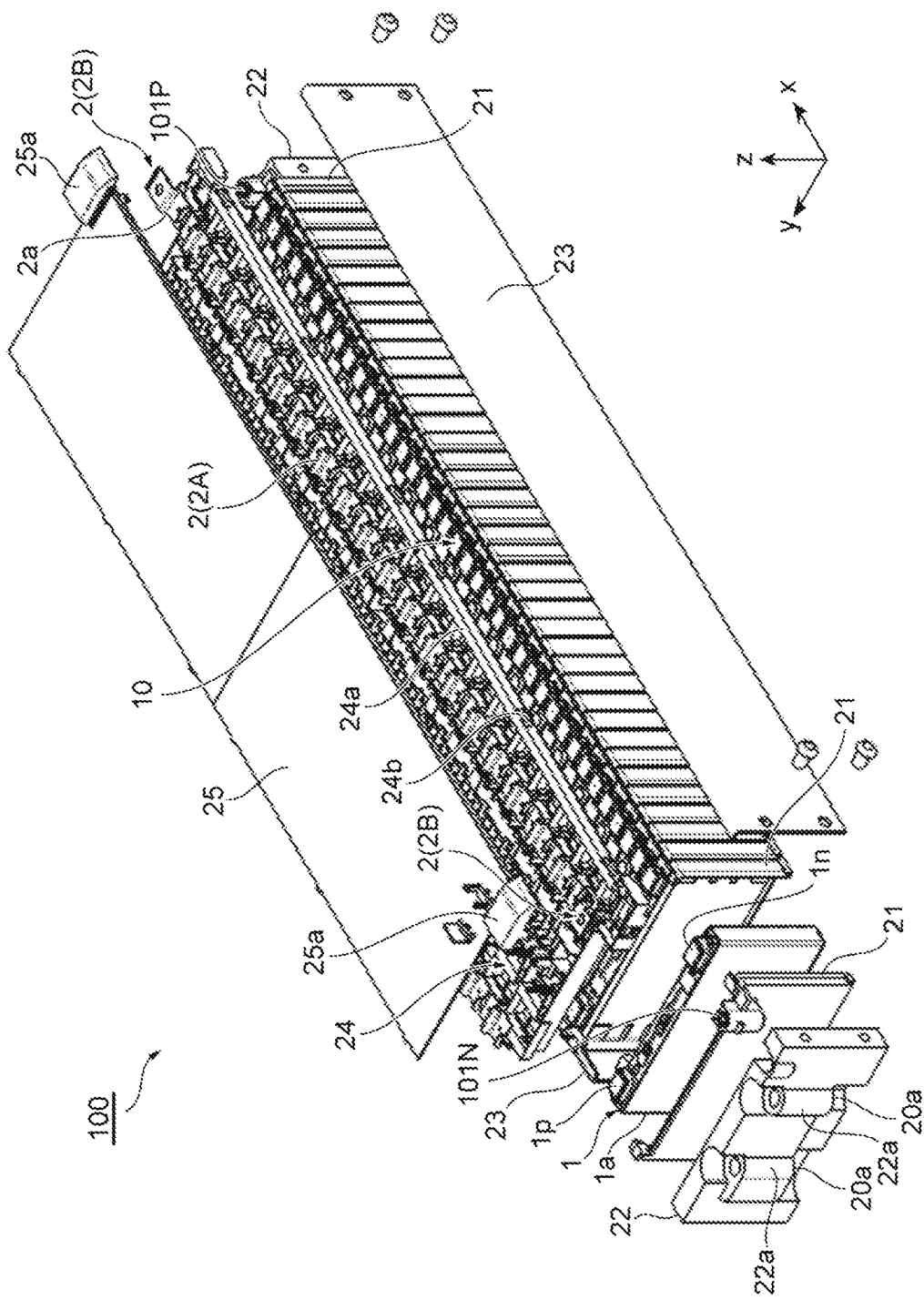
FIG. 2 is an exploded perspective view of the battery module in FIG. 1.

First, the configuration of a battery module 100 will be described referring to FIGS. 1 and 2. FIG. 1 is a perspective view showing the appearance of the battery module 100, and FIG. 2 is an exploded perspective view of the battery module 100.

The battery module 100 mainly includes: module terminals 101P and 101N that are external terminals; a battery cell group 10 including a plurality of battery cells 1; and busbars 2 electrically and mechanically connecting the plurality of battery cells 1 of this battery cell group 10 and electrically and mechanically connecting this battery cell group 10 with the module terminals 101P and 101N. The detailed configuration will be described later, and the most distinctive feature of this embodiment is the busbars 2 that electrically and mechanically connect the plurality of battery cells 1. The battery module 100 includes a housing 20 and an electronic circuit board not shown in addition to the components described above.

The battery cell group 10 is configured so that flattened rectangular battery cells 1, i.e., thin hexahedral or cuboid battery cells 1 having the thickness smaller than the width and the height, are stacked in their thickness direction (x-axis direction). Each battery cell 1 is a rectangular lithium-ion secondary battery, and includes a flattened rectangular cell case 1a, an electrode group and electrolyte not shown that are stored in this cell case 1a, and a pair of cell terminals 1p and 1n connecting to the electrode group and disposed on the vertically upper end face of the cell case 1a. Note here that the cell terminal 1p is a positive electrode terminal and the cell terminal 1n is a negative electrode terminal. The cell terminal 1p and the cell terminal 1n are made of dissimilar metals. In the present embodiment, the cell terminal 1p is made of an aluminum alloy and the cell terminal 1n is made of a copper alloy.

The cell terminals 1p and 1n of the battery cell 1 each have a substantially cuboid three-dimensional shape that protrudes vertically from the upper end face of the cell case 1a. A resin insulating member is disposed between the cell terminal 1p, 1n and the cell case 1a or between the cell case 1a and the electrode group for electrical insulation. The plurality of battery cells 1 making up the battery cell group 10 are stacked while alternately reversing their direction by 180° so that the positive cell terminal 1p of one of mutually adjacent battery cells 1 and the negative cell terminal 1n of the other battery cell 1 are adjacent to each other in the stacking direction (x-axis direction).

The housing 20 has a substantially cuboid shape, having the dimension in the length direction (x-axis direction) that is larger than the dimensions in the width direction (y-axis direction) and in the height direction (z-axis direction), and holds the plurality of battery cells 1 making up the battery cell group 10. Specifically the housing 20 has a plurality of cell holders 21, a pair of end plates 22, a pair of side plates 23, an insulation cover 24, and a module cover 25.

In one example, the cell holders 21 are made of a resin material such as polybutylene terephthalate (PBT). Each cell holder 21 intervenes between mutually adjacent battery cells 1 of the plurality of battery cells 1 stacked in the thickness direction (x-axis direction), and holds these battery cells 1 to sandwich each battery cell 1 from both sides in the thickness direction (x-axis direction). The module terminals 101P and 101N, which are external terminals of the battery module 100, are disposed at a pair of cell holders 21 that are at both ends of the battery cell group 10 in the stacking direction (x-axis direction) of the plurality of battery cells 1 making up the battery cell group 10. The module terminal 101P is a positive electrode terminal and the module terminal 101N is a negative electrode terminal.

The pair of end plates 22 includes plate members made of metal. The pair of end plates 22 is disposed at both ends of the battery cell group 10 via the pair of cell holders 21 disposed on both sides of the battery cell group 10 in the stacking direction (x-axis direction) of the plurality of battery cells 1 making up the battery cell group 10. Each of the end plates 22 as a pair has one face that is opposed to the plurality of battery cells 1 held at the cell holders 21. The other face of the end plate 22 is directed to the outside that is on the other side of the battery cell group 10, and has a fixing part 22a.

The fixing part 22a at each of the end plates 22 as a pair is substantially cylindrical, and a part of the cylindrical face protrudes outward from the outer face of the end plate 22. The cylindrical fixing part 22a has a bolt hole that is bored along the center axis parallel to the height direction (z-axis direction) of the end plate 22. This fixing part 22a of the end plate 22 is to fix the battery module 100 to an external mechanism such as a vehicle or another machine. The lower end face of this fixing part 22a of the end plate 22 is a supported face 20a of the housing 20 that is supported by the external mechanism as stated above.

That is, to fix the battery module 100 to the external mechanism, the operator may place the supported face 20a of the housing 20, which is the bottom face of the fixing part 22a of the end plate 22, on the external mechanism for supporting, and insert a bolt into the bolt hole of the fixing part 22a and screw the bolt together with an internal thread or a nut of the external mechanism for fastening. In other words, the battery module 100 is fixed to the external mechanism with the bolt, and is supported by the external mechanism at the supported face 20a of the housing 20 that is the lower end face of the fixing part 22a of the end plate 22.

When the battery module 100 is mounted on a vehicle such as an electric vehicle or a hybrid vehicle, the external mechanism to fix the battery module 100 is the vehicle body of such a vehicle. Although not limited especially, when the vehicle to fix the battery module 100 is placed on a horizontal road surface, the length direction (x-axis direction) and the width direction (y-axis direction) of the housing 20 of the battery module 100 are substantially parallel to the horizontal direction, and the height direction (z-axis direction) of the housing 20 of the battery module 100 is substantially parallel to the vertical direction. In this state, the supported face 20a of the housing 20 is substantially parallel to the horizontal plane.

The pair of side plates 23 is disposed on both sides of the plurality of battery cells 1 making up the battery cell group 10 in the width direction (y-axis direction) via the cell holders 21. The side plates 23 as a pair are metal members each having a substantially rectangular shape, and are mutually opposed on both sides of the housing 20 in the width direction (y-axis direction). The side plates 23 as a pair are substantially oblongs, having the long-side direction, i.e., longitudinal direction in the stacking direction (x-axis direction) of the plurality of battery cells 1 making up the battery cell group 10 and the short-side direction, i.e., transverse direction in the height direction (z-axis direction) of the plurality of battery cells 1 making up the battery cell group 10. The pair of side plates 23 is fastened at both ends in the longitudinal direction to the pair of end plates 22 by fasteners such as rivets and bolts. The pair of side plates 23 engage with recess-like grooves of the cell holders 21 at both ends in the transverse direction.

The insulation cover 24 is a plate member made of resin such as PBT having an electrical insulating property. The insulation cover 24 is opposed to the upper end face of each cell case 1a having the cell terminals 1p and 1n of the battery cell 1. The insulation cover 24 has openings to expose the upper end faces of the cell terminals 1p and 1n of the plurality of battery cells 1 and a partition wall for insulation between the cell terminals 1p and 1n of the mutually adjacent battery cells 1 and between the mutually adjacent busbars 2. The partition wall of the insulation cover 24 is disposed so as to surround the cell terminals 1p and 1n of the battery cells 1 and the busbars 2. Various types of electric wiring is placed on the insulation cover 24 to connect to the battery cell group 10 and the electronic circuit board.

The electronic circuit board not shown is disposed between the insulation cover 24 and the module cover 25, i.e., on the other side of the insulation cover 24 relative to the battery cell group 10 in the height direction of the housing 20, and electrically connects to the busbars 2 via connecting conductors such as leading wiring and printed wiring and to a temperature sensor (thermistor) to detect the temperatures of the battery cells 1.

The busbars 2 are connecting conductors that electrically and mechanically connect the plurality of battery cells 1 of the battery cell group 10 and electrically and mechanically connect the battery cell group 10 with the module terminals 101P and 101N.

The busbars 2 electrically and mechanically connecting the plurality of battery cells 1 of the battery cell group 10 are a plurality of busbars 2A that electrically and mechanically connect the battery cells 1. These busbars 2A are bonded by welding to the upper end faces of the cell terminals 1p and 1n of the plurality of battery cells 1 of the battery cell group 10 that are exposed through the openings of the insulation cover 24. Each busbar 2A electrically connects the cell terminal 1p of one of mutually adjacent battery cells 1 in the stacking direction and the cell terminal 1n of the other battery cell 1, so as to connect all of the battery cells 1 of the battery cell group 10 in series.

The busbars 2 connecting the battery cell group 10 with the module terminals 101P and 101N are a pair of busbars 2B disposed at both ends of the battery cell group 10 in the stacking direction of the battery cells. One of the busbars 2B as a pair connects to the cell terminal 1p of one of the pair of battery cells 1 disposed at both ends of the plurality of battery cells 1 in the stacking direction. The other busbar 2B connects to the cell terminal 1n of the other of the pair of battery cells 1 disposed at both ends of the plurality of battery cells 1 in the stacking direction.

One end of one of the busbars 2B as a pair is bonded by welding to the upper end face of the cell terminal 1p of one of the battery cells 1, and the other end is fastened to the module terminal 101P disposed at one of the ends of the battery cell group 10 in the stacking direction of the battery cells with a fastener such as a rivet or a bolt. One end of the other of the busbars 2B as a pair is bonded by welding to the upper end face of the cell terminal 1n of one of the battery cells 1, and the other end is fastened to the module terminal 101N disposed at the other end of the battery cell group 10 in the stacking direction with a fastener such as a rivet or a bolt.

The module cover 25 is a plate member made of resin such as PBT having an electrical insulating property. The module cover 25 is disposed at the upper end of the housing 20 on the other side of the battery cell group 10 in the height direction (z-axis direction) of the housing 20 so as to cover the insulation cover 24 and the electronic circuit board. The module cover 25 has terminal covers 25a at the positions corresponding to the module terminals 101P and 101N so as to cover the module terminals 101P and 101N from the above. The module cover 25 is fixed to the upper part of the insulation cover 24 by engaging hooks 24b disposed at the frame 24a of the insulation cover 24 with the side edge of the module cover 25.

The battery module 100 having the above-stated configuration has the module terminals 101P and 101N that electrically connect to an external electric generator or electric motor via an inverter as a power converter, and so exchanges electricity with such an external electric generator or electric motor via the inverter.

Next the following describes the configuration of the busbars 2 in details.

Figure 3:
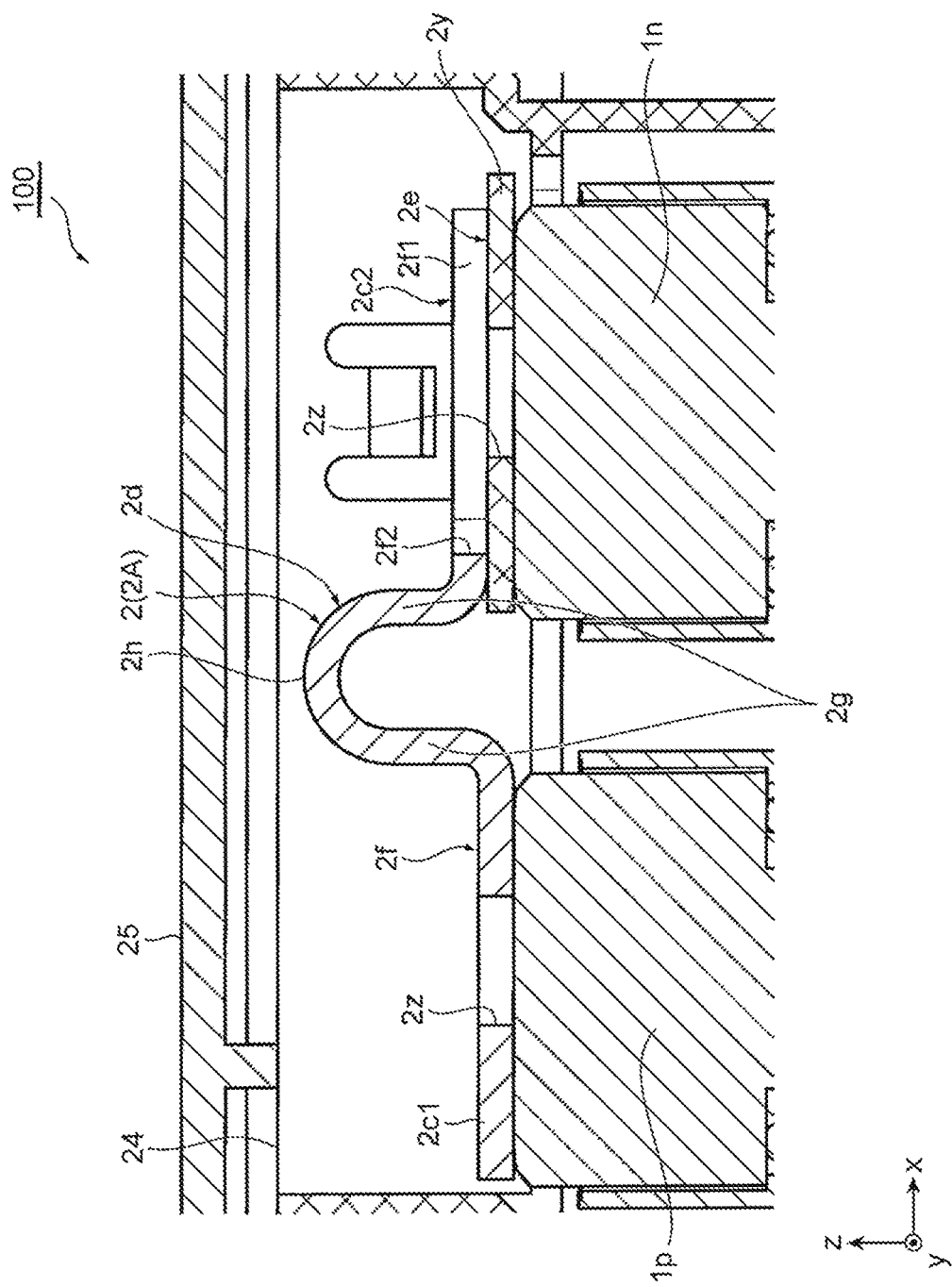
FIG. 3 is an enlarged cross-sectional view of the major part of the battery module in FIG. 1.
Figure 4:
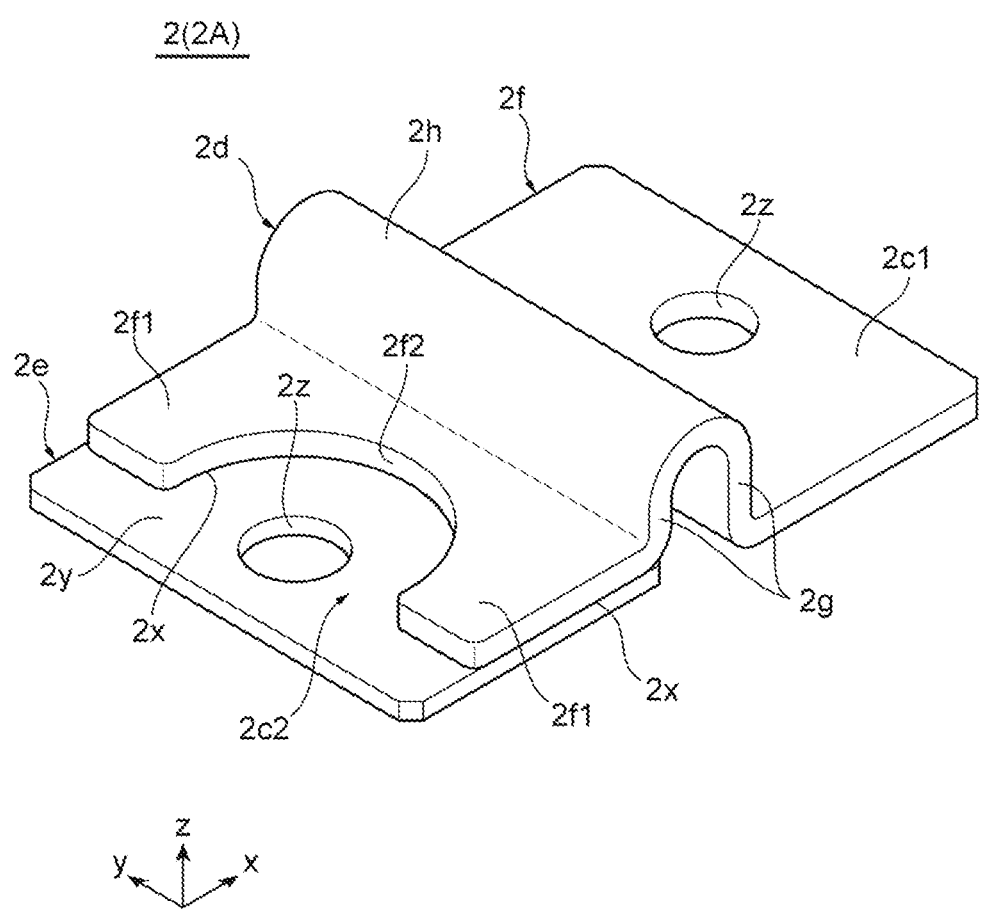
FIG. 4 is a perspective view of the busbar shown in FIG. 3.
Figure 5:
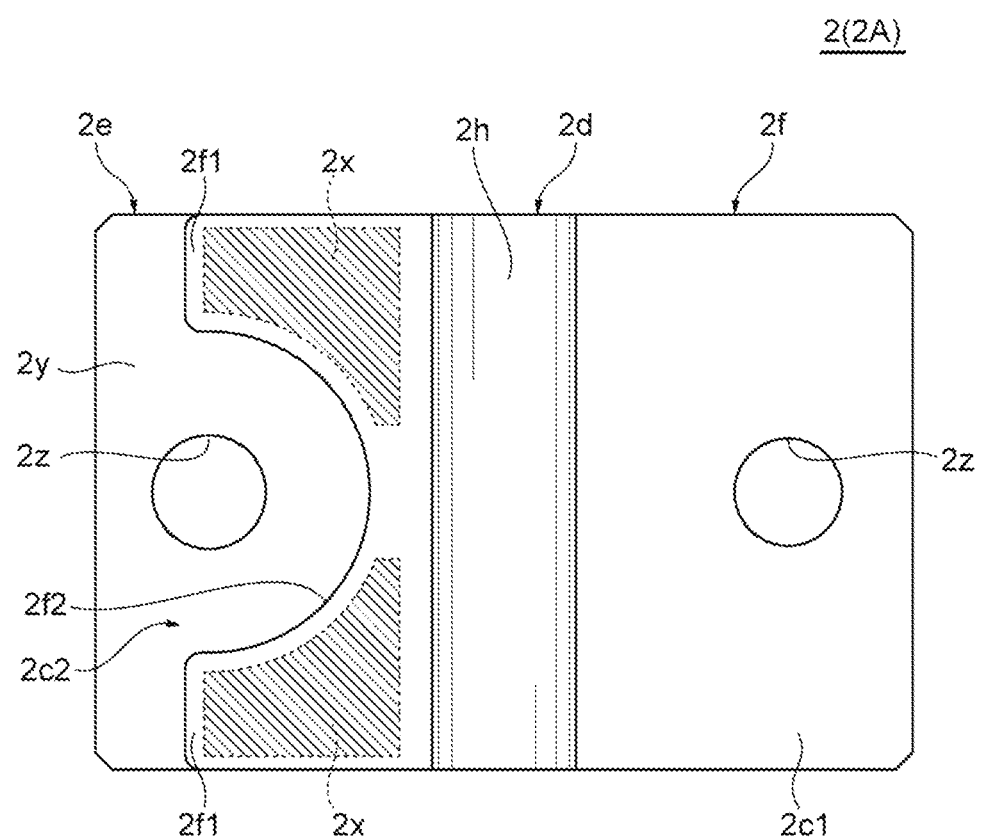
FIG. 5 is a plan view of the busbar shown in FIG. 3.

First, the configuration of the busbar 2A will be described in detail referring to FIGS. 3 to 5. FIG. 3 is an enlarged cross-sectional view of the battery module 100, FIG. 4 is a perspective view of the busbar 2A, and FIG. 5 is a plan view of the busbar 2A. As described above, the battery module 100 of the present embodiment has the most distinctive feature in the structure of the busbar 2A.

As shown in FIG. 3, the busbar 2A is a connecting conductor electrically and mechanically connecting the cell terminal 1p of one of adjacent battery cells 1 in the stacking direction of the battery cells and the cell terminal 1n of the other battery cell 1, and is also a dissimilar metal bonded structure formed by bonding a copper portion (first metal member) 2e containing copper and an aluminum portion (second metal member) 2f containing aluminum.

The busbar 2A has a pair of connection face portions 2c1 and 2c2, and a bridge portion 2d joining this pair of connection face portions 2c1 and 2c2.

Of the pair of connection face portions 2c1 and 2c2, the connection face portion 2c1 to be bonded to the cell terminal 1p is a flat rectangular portion formed only with the aluminum portion 2f, and is disposed on the top surface of the cell terminal 1p and bonded by laser welding. For the laser welding, laser is applied to the surface of the connection face portion 2c1 so as to move the laser along a positioning hole 2z of the connection face portion 2c1 (see FIGS. 4 and 5) with the cell terminal 1p and circumferentially around the solid portion outside the positioning hole 2z to bond the cell terminal 1p and the connection face portion 2c1.

The connection face portion 2c2 to be bonded to the negative cell terminal 1n is a substantially flat rectangular portion where the copper portion 2e and the aluminum portion 2f are overlapped in the overlapping direction (z-axis direction) with the cell terminal 1n, and the copper portion 2e is bonded to the cell terminal 1n by laser welding. The copper portion 2e defines a flat rectangular plate portion, and a pair of arms 2f1 projecting from a flat portion 2g as one of rising portions of the aluminum portion 2f is overlapped on the flat portion for bonding. The connection face portion 2c2 is a dissimilar metal bonded portion where the pair of arms 2f1 including the aluminum portions 2f are overlapped for bonding on the flat rectangular portion including the copper portion 2e (on the opposite side of the cell terminal 1n), that is, on the flat portion. The joint 2x is formed at a bonding portion between the pair of arms 2f1 and the flat portion of the copper portion 2e.

The aluminum portion 2f is arranged so as not to overlap the bonding region between the cell terminal 1n and the copper portion 2e, and has the pair of arms 2f1 extending in a direction from the cell terminal 1p toward the cell terminal 1n. The pair of arms 2f1 is formed by cutting out to have a semicircular shape at a central portion of the aluminum portion 2f in the transverse direction (y-axis direction), which projects from the bridge portion 2d toward the connection face portion 2c2, from the projecting end toward the bridge portion 2d. The pair of arms 2f1 has a width (y-axis direction) such that a cell-terminal 1p-side portion (proximal end portion of the arms 2f1) is wider than a cell-terminal 1n-side portion (distal end portion of the arms 2f1). The pair of arms 2f1 defines a recess 2f2 therebetween, which is a recessed portion of the flat plate that is cut out like a semi-circular shape and recessed toward the bridge portion 2d, so as to expose the copper portion 2e including the positioning hole 2z.

The aluminum portion 2f at the connection face portion 2c2 is a molded product of a rectangular flat plate that is recessed toward the bridge portion 2d. The aluminum portion 2f overlaps only on a part of both ends of the rectangular flat copper portion 2e in the transverse direction (y-axis direction) and on the end of the rectangular flat copper portion 2e close to the bridge portion 2d, and has the recess 2*f*2 that exposes the other portion of the copper portion 2*e* including the bonding region with the cell terminal 1*n*. The copper portion 2*e* of the connection face portion 2*c*2 therefore can be bonded to the cell terminal 1*n* by laser welding. For the laser welding, laser is applied to the surface of the copper portion 2*e* at the connection face portion 2*c*2 so as to move the laser along the positioning hole 2*z* of the copper portion 2*e* of the connection face portion 2*c*2 (see FIGS. 4 and 5) with the cell terminal 1*n* and circumferentially around the solid portion outside the positioning hole 2*z* to bond the cell terminal 1*n* and the copper portion 2*e* of the connection face portion 2*c*2.

Ultrasonic bonding is used for bonding the copper portion 2*e* and the aluminum portion 2*f* at the connection face portion 2*c*2, that is, bonding the flat portion of the copper portion 2*e* and the pair of arms 2*f*1 of the aluminum portion 2*f*. In this embodiment, the overlapping portions with the aluminum portions 2*f* at both ends of the rectangular flat copper portion 2*e* in the transverse direction (y-axis direction) are the joints 2*x* by ultrasonic bonding. Similarly to the width of the pair of arms 2*f*1 (y-axis direction), the joints 2*x* have a bonding width such that a cell terminal 1*p*-side portion (proximal end portion of the arms 2*f*1) is wider than a cell terminal 1*n*-side portion (distal end portion of the arms 2*f*1). The joints 2*x* have a shape that gradually expands in a quadratic curve from the distal end to the proximal end of the arms 2*f*1.

For the ultrasonic bonding, a face of the copper portion 2*e* on the opposite side of the aluminum portion 2*f* is placed on an anvil, and a horn is applied to the surface of the aluminum portion 2*f* on the opposite side of the copper portion 2*e* so as to sandwich the copper portion 2*e* and the aluminum portion 2*f* between the anvil and the horn, and apply ultrasonic vibrations to the overlapping portion of the copper portion 2*e* and the aluminum portion 2*f* for bonding of the copper portion 2*e* and the aluminum portion 2*f*. The joints 2*x* are formed by ultrasonic bonding of the copper portion 2*e* and the pair of arms 2*f*1 of the aluminum portion 2*f*, and have ultrasonic bonding marks 2*m* on the back side of the joint of the copper portion 2*e*.

In the present embodiment, the copper portion 2*e* that is to be ultrasonically bonded undergoes plating as the coating processing. The copper portion 2*e* or the aluminum portion 2*f* or both of them may undergo the coating processing. Plating may be applied to only one face or the entire face. Such plating to at least one of the copper portion 2*e* and the aluminum portion 2*f* makes it easy to connect them by ultrasonic connection and improves the electrical conductivity. Examples of the plating include tin plating and nickel plating. In particular, nickel plating can be performed at a relatively low cost, and so the cost can be reduced.

In this way, this embodiment includes the joints 2*x* of the copper portion 2*e* and the aluminum portion 2*f* formed at the connection face portion 2*c*2. Such joints 2*x* of the copper portion 2*e* and the aluminum portion 2*f* formed at the connection face portion 2*c*2 increases the rigidity of the joints 2*x* of the copper portion 2*e* and the aluminum portion 2*f* and so increases the natural frequency, because the cell terminal 1*n* is a strong member. The present embodiment therefore reduces stress acting on the joints 2*x* between the copper portion 2*e* and the aluminum portion 2*f* due to vibrations of the battery module 100 or the like and keeps a wide area of the joints 2*x*, and so keeps the joint strength high at the joints 2*x* between the copper portion 2*e* and the aluminum portion 2*f*.

The present embodiment therefore enhances the resistance of the battery module 100 against vibrations and the like, and provides a reliable battery module 100.

The bridge portion 2*d* is an inverted U-shaped portion formed only with the aluminum portion 2*f*, and has a pair of flat portions 2*g* (they may be called rising portions) rising vertically or at a steep angle upward from the bridge portion 2*d*-side ends of the aluminum portions 2*f* that define the connection face portions 2*c*1 and 2*c*2, and a folded portion 2*h* (this may be called a connecting portion) connecting between the pair of flat portions 2*g*. The folded portion 2*h* is curved in an arch shape.

A part of the copper portion 2*e* defining the connection face portion 2*c*2 and exposed from the aluminum portion 2*f* is an end portion projecting in the direction opposite to the bridge portion 2*d* of the rectangular flat copper portion 2*e*. This part serves as a detection conductor to detect the voltage, and is provided as a voltage detection wire joint 2*y* where lead wiring (not shown) for voltage detection is bonded by brazing or ultrasonic welding. The voltage detection wire joint 2*y* may be formed by connecting the lead wiring to a part of the copper portion 2*e* that is different from the joints 2*x* and the bonded portion between the busbar 2 and the cell terminal 1*n*. The voltage detection wire joint 2*y* may be located at the aluminum portion 2*f* defining the connection face portion 2*c*1.

Figure 8:
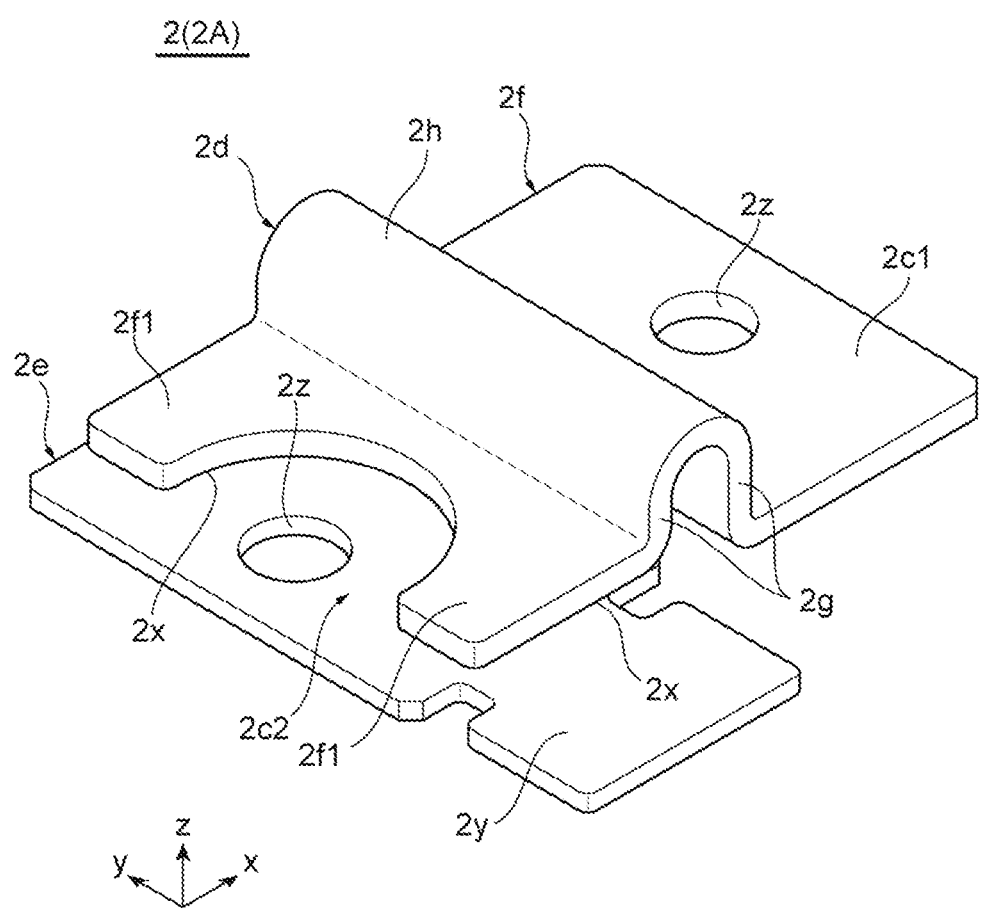
FIG. 8 is a perspective view of a busbar having a voltage detection wire joint disposed at a metal member of the connection face portion.

In another example as shown in FIG. 8, a terminal for bonding voltage detection wiring may extend out as the voltage detection wire joint 2*y* from the aluminum portion 2*f* defining the connection face portion 2*c*1 or the copper portion 2*e* defining the connection face portion 2*c*2, and lead wiring for voltage detection (not shown) may be bonded to this extended terminal by brazing or ultrasonic welding. The extended terminal and the lead wiring may be connected with a terminal including an elastic member for bonding them under pressure.

The busbars 2 of the present embodiment connect the terminals (1*p*, 1*n*) of a plurality of battery cells 1 made of dissimilar metals. Each busbar 2 includes the copper portion 2*e* (first metal member) to be connected to one of the cell terminal 1*n* (first terminal) of one of the battery cell 1 (a first battery cell) of the plurality of battery cells 1, the aluminum portion 2*f* (second metal member) to be connected to the other cell terminal 1*p* (second terminal) of adjacent another battery cell 1 (second battery cell), the aluminum portion being made of a material different from that of the copper portion 2*e*, and the joint 2*x* bonding the copper portion 2*e* and the aluminum portion 2*f*. The aluminum portion 2*f* is placed so as not to overlap the bonding region between the cell terminal 1*n* and the copper portion 2*e*, and has the pair of arms 2*f*1 extending in the direction from the cell terminal 1*p* toward the cell terminal 1*n*. The joints 2*x* are formed by bonding the copper portion 2*e* and the pair of arms 2*f*1, and the pair of arms 2*f*1 has a width such that a cell terminal 1*p*-side portion is wider than a cell terminal 1*n*-side portion.

This embodiment therefore increases the rigidity of the joints 2*x* between the copper portion 2*e* and the aluminum portion 2*f* and so increases the natural frequency, and keeps a wide area of the joints 2*x*. The present embodiment therefore reduces stress acting on the joints 2*x* between the copper portion 2*e* and the aluminum portion 2*f* due to vibrations of the battery module 100 or the like, and so keeps the joint strength high at the joints 2*x* between the copper portion 2*e* and the aluminum portion 2*f*. The present embodiment therefore enhances the resistance of the battery module 100 against vibrations and the like, and provides a reliable battery module 100.

The busbars 2 of the present embodiment are each formed by bonding these copper portion 2e and aluminum portion 2f, and so are produced at a lower cost than using a clad material. The copper portion 2e and the aluminum portion 2f can be easily manufactured by pressing, and the unit price of the parts is kept low.

The present embodiment describes the example of including the relatively large second metal member including inexpensive aluminum and the relatively small first metal member including copper. In another example, the first metal member may include aluminum, and the second metal member may include copper.

Second Embodiment

Figure 6:
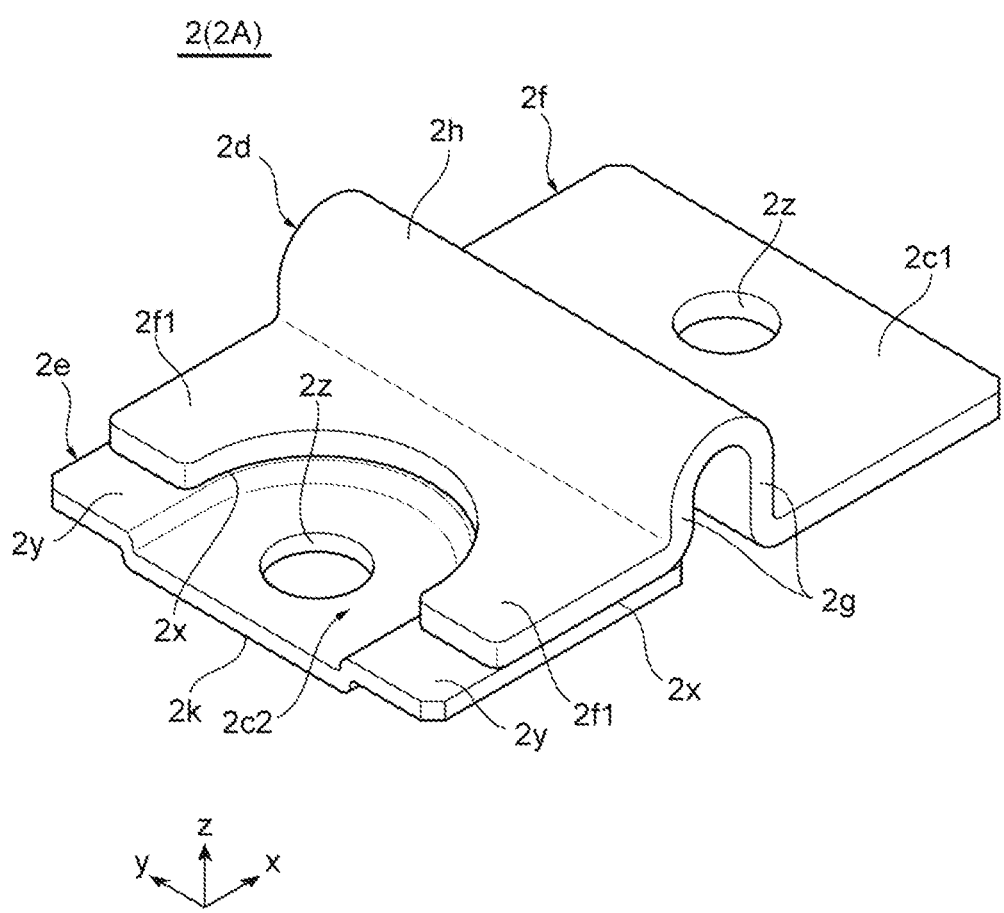
FIG. 6 is a perspective view of a busbar connecting battery cells of a battery module according to a second embodiment of the present invention.
Figure 7:
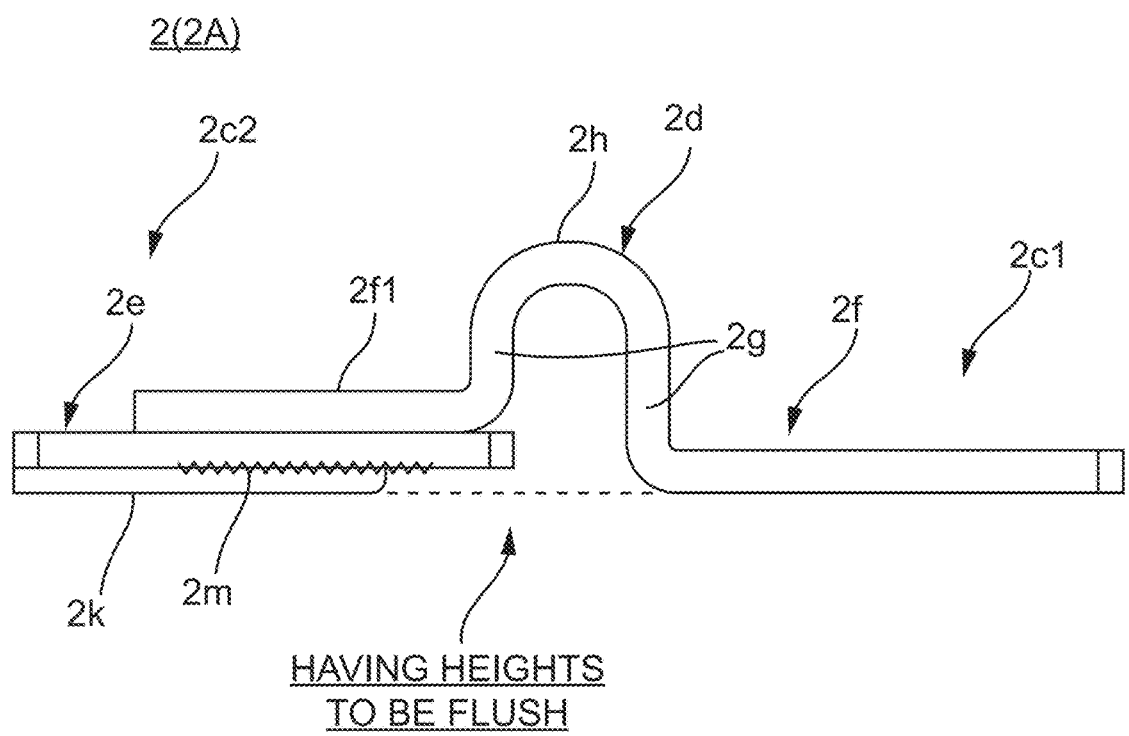
FIG. 7 is a side view showing the busbar according to the second embodiment of the present invention.

FIGS. 6 to 7 show a second embodiment of the present invention.

Similarly to the first embodiment as described above, this embodiment is for keeping a joint strength high at the joint 2x between the copper portion 2e and the aluminum portion 2f of the busbar 2A, and its structure is different from that of the first embodiment. FIG. 6 is a perspective view of the busbar 2A, and FIG. 7 is a side view of the busbar 2A. The configuration of the battery module is the same as that of the first embodiment except for the busbar 2A, and the following only describes differences from the first embodiment.

This embodiment has a feature in that the bonding face of the copper portion 2e with the cell terminal 1n protrudes toward the cell terminal 1n from the joints 2x. In the present embodiment, the connection face portion 2c2 of the copper portion 2e has a flat protruding portion 2k that is a flat projecting plate being different in height and projecting toward the cell terminal 1n. The flat protruding portion 2k is a region excluding the anvil region for ultrasonic bonding, which is a bonding method between the copper portion 2e and the aluminum portion 2f. That is, the flat protruding portion 2k does not have bonding marks of ultrasonic bonding on the bonding face of the copper portion 2e with the cell terminal 1n, and has a smooth surface.

The connection face portion 2c2 to be connected to the top surface of the cell terminal 1n and the connection face portion 2c1 to be connected to the top surface of the cell terminal 1p have the heights to be flush.

When the bonding method of the joints 2x is ultrasonic bonding, bonding marks that affect the smoothness may be formed on the connection face of the copper portion 2e with the cell terminal 1n, depending on the bonding conditions and the anvil shape. Such bonding marks affecting the smoothness will easily cause a gap between the connection face portion 2c2 with the cell terminal 1n and the top surface of the cell terminal 1n during laser welding of the connection face portion 2c2 to the cell terminal 1n, which may induce welding defects.

This embodiment keeps a joint strength high at the joints 2x of the copper portion 2e and the aluminum portion 2f even under the ultrasonic-bonding conditions that form bonding marks affecting the smoothness, and keeps the good quality of laser welding of the copper portion 2e with the cell terminal 1n.

The present embodiment therefore enhances the resistance of the battery module 100 against vibrations and the like, and provides a reliable battery module 100.

That is a detailed description of the embodiments of the present disclosure. The present disclosure is not limited to the above-stated embodiments, and the design may be modified variously without departing from the spirits of the present disclosure. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

REFERENCE SIGNS LIST

1 Battery cell
1p Cell terminal
1n Cell terminal
2 Busbar
2A Busbar
2B1(2B) Busbar
2B2(2B) Busbar
2a Fuse
2c1 Connection face portion
2c2 Connection face portion
2d Bridge portion
2e Copper portion
2f Aluminum portion
2g Flat portion
2h Folded portion
2k Flat protruding portion
2v Flat portion
2x Joint
2y Voltage detection wire joint
2z Positioning hole
Battery cell group
100 Battery module
Housing
20a Supported face
101P Module terminal
101N Module terminal

The invention claimed is:

1. A busbar that joins terminals of a plurality of battery cells, the terminals each including a dissimilar metal, the busbar comprising:
a first metal member to be connected to a first terminal of a first battery;
a second metal member to be connected to a second terminal of a second battery, the second metal member including a material that is different from a material of the first metal member; and
a joint including the first metal member bonded to the second metal member,
the second metal member being disposed so as not to overlap a bonding region between the first terminal and the first metal member, and having at least one arm extending in a direction from the second terminal to the first terminal,
the joint including the first metal member bonded to the at least one arm,
the at least one arm having a width such that a proximal end portion is wider than a distal end portion of the arm, and
the first metal member has a flat protruding portion extending from an end of the second metal member including the at least one arm to an end of the first metal member, protruding away from the joint toward the first terminal, and including a bonding face that bonds with the first terminal, wherein the flat protruding portion protrudes below other portions of the first metal member which are disposed around an outer periphery of the flat protruding portion.

2. The busbar according to claim 1, wherein the joint becomes wider in a direction from the distal end to the proximal end of the at least one arm.

3. The busbar according to claim 1, wherein the first metal member has a bonding face to be connected with the first terminal, the second metal member has a bonding face to be connected with the second terminal, and the bonding faces have heights to be flush.

4. The busbar according to claim 1, wherein the joint includes the first metal member that is ultrasonic bonded to the at least one arm, and the first metal member has ultrasonic bonding marks on a back side of the joint.

5. The busbar according to claim 1, wherein the at least one arm include a pair of arms, and the first metal member and the second metal member are disposed so that a bonding region of the first terminal with the first metal member is placed between the pair of arms.

6. The busbar according to claim 1, wherein one of the metal members includes a detection conductor configured to detect voltage of the battery cell, and the detection conductor is connected to a portion of the metal member that is different from the joint and a bonded portion between the busbar and the first terminal.

7. The busbar according to claim 1, wherein the first metal member includes a metal material containing copper, and the second metal member includes a metal material containing aluminum.

8. The busbar according to claim 1, wherein the first metal member includes a metal material containing aluminum, and the second metal member includes a metal material containing copper.

9. The busbar according to claim 1, wherein the joint is tin-plated or nickel-plated.

10. The busbar according to claim 1, wherein at least one of the first metal member and the second metal member is tin-plated or nickel-plated on an entire surface of the member.

11. A battery module including the busbar according to claim 1.

* * * * *